W. MEYER, Jr.
HOBBLE.
APPLICATION FILED MAR. 8, 1917.
1,244,628.
Patented Oct. 30, 1917.
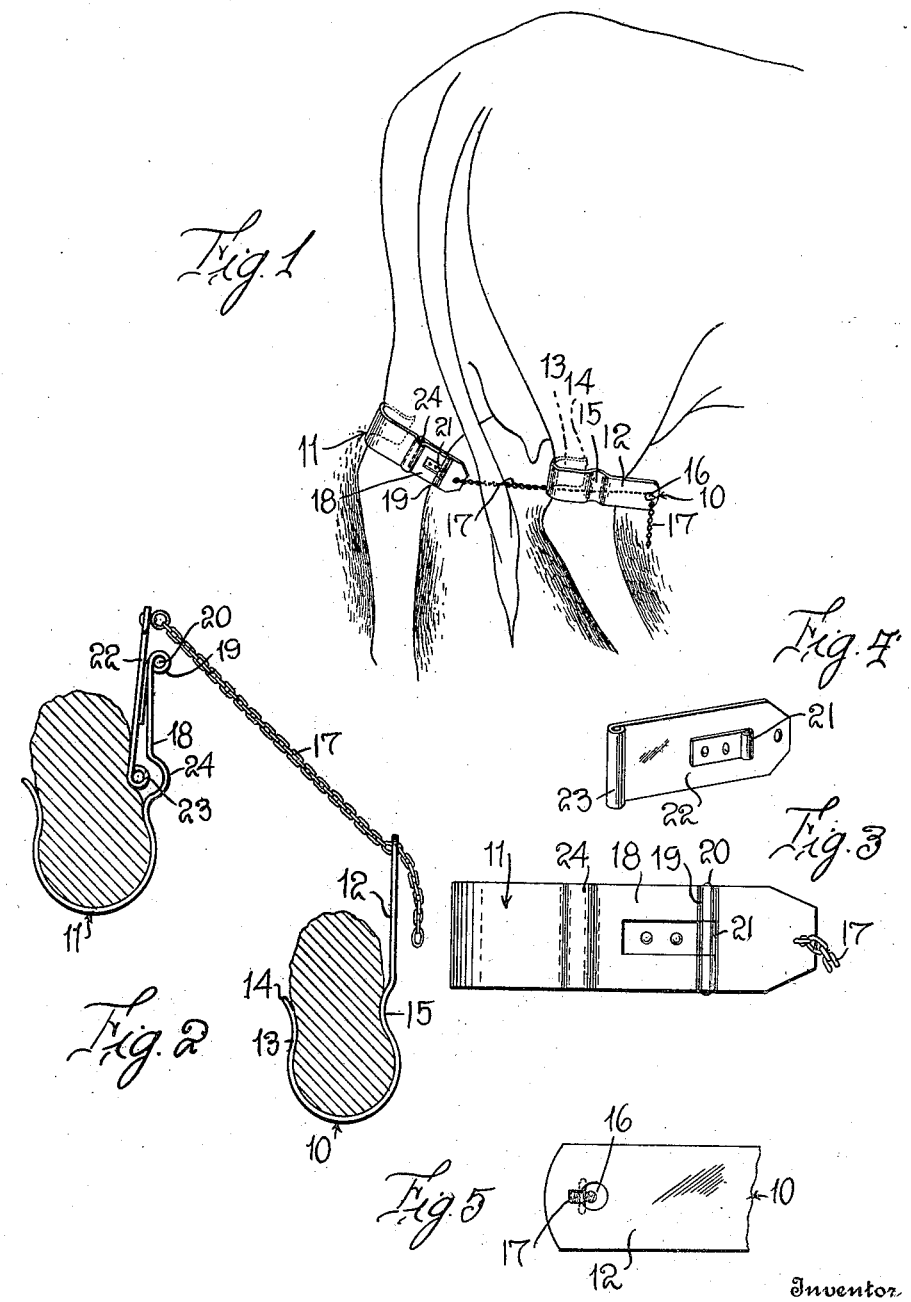
Inventor
WILLIAM MEYER JR.
By Watson E. Coleman
Attorney

UNITED STATES PATENT OFFICE.

WILLIAM MEYER, JR., OF SWEDEBURG, NEBRASKA.

HOBBLE.

1,244,628.  Specification of Letters Patent.  Patented Oct. 30, 1917.

Application filed March 8, 1917. Serial No. 153,467.

*To all whom it may concern:*

Be it known that I, WILLIAM MEYER, Jr., a citizen of the United States, residing at Swedeburg, in the county of Saunders and State of Nebraska, have invented certain new and useful Improvements in Hobbles, of which the following is a specification, reference being had to the accompanying drawings.

This invention relates to devices for hobbling cattle and particularly to that class of hobbles in which leg clamps are provided connected by a chain.

The general object of my invention is to provide a device of this character which is very simple, may be cheaply made and readily applied.

A further object of the invention is to provide a hobble wherein two leg clamps are used, upon one of the leg clamps there being attached a pivoted clamping member which is connected by a flexible connection to the other leg clamp so that if the animal attempts to kick or move unduly, the pivoted member will pinch against the leg of the animal, thus causing a considerable pain and deterring the cow or other animal from kicking or unduly moving.

Other objects will appear in the course of the following description.

The invention is illustrated in the accompanying drawing in which:

Figure 1 is a perspective view showing my hobble applied.

Fig. 2 is a top plan view of the hobble, the legs of the cow being shown in section; and Fig. 3 is an enlarged elevation of clamp 11.

Fig. 4 is a perspective view of the pinching member 22; and

Fig. 5 is a fragmentary elevation of one end of clamp 12, the chain 17 being shown in section.

Referring to these drawings, it will be seen that my improved hobble comprises a clamp 10 for the right leg and a clamp 11 for the left leg of the cow. These clamps are preferably made of strap iron of sufficient thickness to hold its shape and yet sufficiently yieldable so that it may be slipped upon the leg of the animal. The clamp 10 is substantially U-shaped in form and is provided with a shank 12 which at one end is curved over upon but spaced from the shank 12 to provide the leg 13, this leg being outwardly curved as at 14 at its extremity. Opposite the outwardly curved portion 14, the shank 12 is formed with an inwardly bent portion 15. The leg 13 is somewhat resilient so that the leg of the cow will be clamped between the protuberant portion 15 and this leg 13. The shank 12 toward its forward end is inwardly deflected slightly and at its forward end is connected to a chain 17 in turn attached to clamp 11. The clamp 11 is formed with a shank and at one end is turned over upon itself to form a hook adapted to engage the leg of the cow, this hook at its bill being outwardly turned. The extremity of the shank 18 is slotted and formed with a transversely extending bead 19 for the passage of a pintle 20. Pivotally or hingedly connected to the pintle 20 is a lever 22 having attached thereto a bead 21 which surrounds the pintle 20, this lever being formed at one end with a bead 23 constituting a head and at its outer end being operatively connected to chain 17. The shank 18 of the hook 11 is outwardly bowed, as at 24, so that the head or bead 23 will be disposed in the recess so formed when the lever 22 extends parallel to the shank 18 as illustrated in Fig. 2. Preferably the shank 12 of the clamping member 10 is formed with a keyhole slot 16, with the narrow portion of which the links of chain 17 may be engaged and thus the chain adjusted for length.

In the practical use of this invention the leg clamp 11 is placed upon the left leg of the animal, the hooked portion extending over the leg above the knee joint and on the rear portion of the leg and the clamp 10 is engaged over the right leg of the animal, the chain extending around the front of the right leg and to the leg gripping lever on the left leg which is disposed on the inside of the left leg of the animal. Now if the animal attempts to kick or move its legs apart from each other, the lever pinches the leg of the animal, causing considerable pain and thus checking any sudden movement of the animal's legs from a position where the chain is slack to a position where the chain is taut. It will thus be obvious that the animal will be restrained from kicking or unduly moving by the pain caused by said movement. When the animal moves, it is seen that the clamps tighten on the leg so that the hobble can not be pulled off.

While this device is primarily intended for the purpose of preventing a cow from kicking or moving around while she is being milked, yet it will be obvious that it may also be used for a means for restraining cows or other animals from straying.

Having described the invention, what I claim is:

1. A hobble of the character described including leg engaging clamps, a leg pinching member mounted upon one of the clamps, and means connecting said member to the other leg clamp to cause an inward movement of the pinching member when the animal walks.

2. A hobble of the character described comprising two leg clamps, a lever mounted upon one of said clamps and having a head, and a flexible connection between the other of said clamps and said lever of such character that the head end of the lever will be shifted inward against the leg of the animal by the tightening of the flexible member due to the movement of the legs of the animal.

3. A hobble of the character described including two leg clamps, a pinching member pivoted upon one clamp and having an enlarged head, this pinching member normally lying parallel to one leg of the leg clamp, and a flexible connection attached to the other clamp and to the free end of said pinching member whereby to cause the inward movement of the head end of the pinching member when the animal walks.

4. A hobble of the character described comprising two approximately U-shaped leg clamps of strap iron adapted to engage the legs of the animal, a pinching member hingedly mounted upon one leg clamp intermediate its ends and having a protuberance at its inner end, a chain adjustably engaged with the other leg clamp and connected to the forward end of the pinching member, said chain being adapted to be disposed in front of the legs so that when the chain is tightened by the movement of the legs, the pinching member will be shifted to move the protuberant end of the pinching member inward against the corresponding leg of the animal.

5. A hobble of the character described including a leg engaging clamp, a leg pinching member mounted upon the clamp, and means adapted to be connected to another leg of an animal and connected to said pinching member to cause an inward movement of the pinching member when the animal walks.

In testimony whereof I hereunto affix my signature in the presence of two witnesses.

WILLIAM MEYER, Jr.

Witnesses:
C. E. KENDALL,
ROY MEYER.